United States Patent
Lee et al.

(10) Patent No.: US 11,728,542 B2
(45) Date of Patent: Aug. 15, 2023

(54) SEPARATOR FOR ELECTROCHEMICAL DEVICE COMPRISING INORGANIC COATING LAYER AND METHOD FOR MANUFACTURING THE SAME

(71) Applicant: LG Chem, Ltd., Seoul (KR)

(72) Inventors: Joo-Sung Lee, Daejeon (KR); A-Young Lee, Daejeon (KR)

(73) Assignee: LG Chem, Ltd.

( * ) Notice: Subject to any disclaimer, the term of this patent is extended or adjusted under 35 U.S.C. 154(b) by 196 days.

(21) Appl. No.: 17/043,289

(22) PCT Filed: Jun. 12, 2019

(86) PCT No.: PCT/KR2019/007107
§ 371 (c)(1),
(2) Date: Sep. 29, 2020

(87) PCT Pub. No.: WO2019/240501
PCT Pub. Date: Dec. 19, 2019

(65) Prior Publication Data
US 2021/0020887 A1    Jan. 21, 2021

(30) Foreign Application Priority Data

Jun. 12, 2018 (KR) .......................... 10-2018-0067486

(51) Int. Cl.
*H01M 4/62* (2006.01)
*H01M 10/0569* (2010.01)
(Continued)

(52) U.S. Cl.
CPC ......... *H01M 50/431* (2021.01); *H01M 4/623* (2013.01); *H01M 10/0569* (2013.01);
(Continued)

(58) Field of Classification Search
CPC .. H01M 50/431; H01M 50/403; H01M 50/46; H01M 4/623; H01M 10/0569; H01M 2300/0028

See application file for complete search history.

(56) References Cited

U.S. PATENT DOCUMENTS

2010/0273065 A1    10/2010    Lee et al.
2012/0085484 A1    4/2012    Lee
(Continued)

FOREIGN PATENT DOCUMENTS

CN    105794019 A    7/2016
CN    106654119 A    5/2017
(Continued)

OTHER PUBLICATIONS

Extended European Search Report for Application No. 19818827.8 dated Jun. 18, 2021. 7 pgs.
(Continued)

*Primary Examiner* — Miriam Stagg
*Assistant Examiner* — Rachel L Zhang
(74) *Attorney, Agent, or Firm* — Lerner David LLP

(57) ABSTRACT

A separator for an electrochemical device, including a porous substrate and an inorganic coating layer formed on at least one surface of the porous substrate and method for manufacturing the same are provided. The inorganic coating layer includes a binder resin and inorganic particles, and the binder resin includes a polyvinylidene fluoride-based resin and shows a low electrolyte absorption ratio. The separator has excellent adhesion with an electrode and shows low resistance characteristics.

12 Claims, 2 Drawing Sheets

(51) Int. Cl.
*H01M 50/431* (2021.01)
*H01M 50/403* (2021.01)
*H01M 50/46* (2021.01)
*H01M 50/409* (2021.01)
*H01M 50/489* (2021.01)
*H01M 50/443* (2021.01)

(52) U.S. Cl.
CPC ....... *H01M 50/403* (2021.01); *H01M 50/409* (2021.01); *H01M 50/443* (2021.01); *H01M 50/46* (2021.01); *H01M 50/489* (2021.01); *H01M 2300/0028* (2013.01)

(56) References Cited

U.S. PATENT DOCUMENTS

| | | | |
|---|---|---|---|
| 2013/0095365 A1 | 4/2013 | Nishikawa | |
| 2014/0050965 A1 | 2/2014 | Ha et al. | |
| 2016/0336568 A1 | 11/2016 | Umeyama et al. | |
| 2017/0092982 A1* | 3/2017 | Kuo | B01J 41/13 |
| 2017/0098809 A1 | 4/2017 | Ogata et al. | |
| 2018/0047962 A1 | 2/2018 | Honda | |
| 2018/0123106 A1 | 5/2018 | Shin et al. | |

FOREIGN PATENT DOCUMENTS

| | | |
|---|---|---|
| CN | 107666011 A | 2/2018 |
| EP | 3070764 A1 | 9/2016 |
| EP | 3764424 A1 | 1/2021 |
| JP | 201633913 A | 3/2016 |
| JP | 2016184467 A | 10/2016 |
| JP | 2017135111 A | 8/2017 |
| KR | 20080108043 A | 12/2008 |
| KR | 20120036043 A | 4/2012 |
| KR | 20120052100 A | 5/2012 |
| KR | 20130031319 A | 3/2013 |
| KR | 101430975 B1 | 8/2014 |
| KR | 20150050060 A | 5/2015 |
| KR | 20160134534 A | 11/2016 |
| KR | 20170024574 A | 3/2017 |
| KR | 20170040081 A | 4/2017 |
| TW | I497791 B | 8/2015 |
| WO | 2012111956 A2 | 8/2012 |
| WO | 2019192475 A1 | 10/2019 |

OTHER PUBLICATIONS

Search report from International Application No. PCT/KR2019/007107, dated Sep. 9, 2019.

Search Report dated Jun. 19, 2022 from the Office Action for Taiwanese Application No. 108120134 dated Jun. 23, 2022, 1 page.

* cited by examiner

SEPARATOR FOR ELECTROCHEMICAL DEVICE COMPRISING INORGANIC COATING LAYER AND METHOD FOR MANUFACTURING THE SAME

CROSS-REFERENCE TO RELATED APPLICATION

The present application is a national phase entry under 35 U.S.C. § 371 of International Application No. PCT/KR2019/007107 filed Jun. 12, 2019 which claims priority from Korean Patent Application No. 10-2018-0067486 filed on Jun. 12, 2018 in the Republic of Korea. The disclosure of which are incorporated herein by reference in their entirety.

TECHNICAL FIELD

The present disclosure relates to a separator for an electrochemical device, wherein the electrochemical device may be a primary battery or secondary battery and the secondary battery includes a lithium ion secondary battery.

BACKGROUND ART

A non-aqueous secondary battery represented by a lithium ion secondary battery has been used widely as a power source for portable electronic instruments, such as notebook computers, cellular phones, digital cameras and camcorders. In addition, recently, such batteries have been studied about their application to vehicles by virtue of their characteristic high energy density.

As portable electronic instruments have been downsized and weight-lightened, casings for non-aqueous secondary batteries have been simplified. Initially, a battery can made of stainless steel was used as a casing. However, since a casing made of aluminum was developed, a soft pack casing made of an aluminum laminate pack has been developed recently. In the case of a soft pack casing made of an aluminum laminate, it is flexible, and thus a gap may be formed between an electrode and a separator during charge/discharge so that there is a technical problem in that cycle life is degraded. To solve this, a technology of adhesion of an electrode with a separator is important and many technical solutions have been suggested.

As one of such suggestions, there is known use of a separator including a porous layer (also referred to as an adhesive porous layer) including a polyvinylidene fluoride-based resin formed on a polyolefin microporous layer as a conventional separator (see, Patent Document 1). The adhesive porous layer allows good adhesion between an electrode and a separator, when it is stacked on the electrode while including an electrolyte and then subjected to hot pressing, and thus can function as an adhesive. Thus, it is possible to improve the cycle life of a soft pack battery.

In addition, when manufacturing a battery by using a conventional metallic can casing, a battery device is formed by winding stacked electrodes and separators, and sealing the device in a metallic can casing together with an electrolyte to obtain a battery. Meanwhile, when a soft pack battery is manufactured by using the separator as disclosed in Patent Document 1, a battery device is manufactured in the same manner as the battery using the metallic can casing, the battery device is sealed in a soft pack casing together with an electrolyte, and then a hot pressing step is carried out to obtain a battery. Therefore, when using the separator having the above-mentioned adhesive porous layer, it is possible to obtain a battery device in the same manner as the battery using the metallic can casing. Thus, there is a merit in that any significant modification is not required in addition to the conventional process for manufacturing a battery using a metallic can casing.

Under these circumstances, various technical suggestions have been made to date about a separator including an adhesive porous layer stacked on a polyolefin microporous membrane. For example, Patent Document 1 discloses a novel technical suggestion considering the porous structure and thickness of a polyvinylidene fluoride-based resin layer in terms of ensuring sufficient adhesive property combined with ion permeability.

DISCLOSURE

Technical Problem

The present disclosure is directed to providing a separator which has low resistance characteristics and a low electrolyte absorption ratio while ensuring adhesive property, and a battery including the same. The present disclosure is also directed to providing a method for manufacturing the separator and a method for manufacturing the battery. It will be easily understood that the objects and advantages of the present disclosure may be realized by the means shown in the appended claims and combinations thereof.

Technical Solution

In one aspect of the present disclosure, there is provided a separator for an electrochemical device. According to the first embodiment of the present disclosure, there is provided a separator for an electrochemical device, including a porous substrate and an inorganic coating layer formed on at least one surface of the porous substrate, wherein the inorganic coating layer includes a binder resin and inorganic particles, and the binder resin is a polyvinylidene fluoride-based resin containing at least one polymerization unit selected from the group consisting of trifluoroethylene and tetrafluoroethylene.

According to the second embodiment of the present disclosure, there is provided the separator for an electrochemical device as defined in the first embodiment, wherein the polyvinylidene fluoride-based resin has a substitution ratio of 5-30 mol % with the polymerization unit.

According to the third embodiment of the present disclosure, there is provided the separator for an electrochemical device as defined in the first or the second embodiment, wherein the polyvinylidene fluoride-based polymer resin has a substitution ratio of 5-15 mol % with the polymerization unit.

According to the fourth embodiment of the present disclosure, there is provided the separator for an electrochemical device as defined in any one of the first to the third embodiments, wherein the polyvinylidene fluoride-based resin has a melting point (Tm) of 145° C. or lower.

According to the fifth embodiment of the present disclosure, there is provided the separator for an electrochemical device as defined in any one of the first to the fourth embodiments, wherein the polyvinylidene fluoride-based resin has an electrolyte absorption ratio of 30% or less as determined by the following Formula 1:

$$\text{Electrolyte absorption ratio (\%)} = [(\text{Weight of polymer resin after dipping} - \text{Weight of initial polymer resin})/(\text{Weight of initial polymer resin})] \times 100 \qquad [\text{Formula 1}]$$

According to the sixth embodiment of the present disclosure, there is provided the separator for an electrochemical device as defined in any one of the first to the fifth embodiments, wherein the electrolyte includes an organic solvent and a lithium salt, and the organic solvent includes an ester based compound in an amount of 30 wt % or more based on 100 wt % of the organic solvent.

According to the seventh embodiment of the present disclosure, there is provided the separator for an electrochemical device as defined in any one of the first to the sixth embodiments, wherein the binder resin and inorganic particles are present at a weight ratio of 15:85-50:50 in the inorganic coating layer.

According to the eighth embodiment of the present disclosure, there is provided the separator for an electrochemical device as defined in any one of the first to the seventh embodiments, wherein the inorganic coating layer has an average pore size of 20-800 nm.

According to the ninth embodiment of the present disclosure, there is provided an electrochemical device including an electrode assembly and an electrolyte, wherein the electrode assembly includes a positive electrode, a negative electrode and a separator interposed between the positive electrode and the negative electrode, and the separator is defined in any one of the first to the eighth embodiments.

According to the tenth embodiment of the present disclosure, there is provided the electrochemical device as defined in the ninth embodiment, wherein the electrolyte includes an organic solvent and a lithium salt, and the organic solvent includes an ester based compound in an amount of 30 wt % or more based on 100 wt % of the organic solvent.

Advantageous Effects

The separator according to an embodiment of the present disclosure and the electrochemical device including the same show excellent adhesion between a separator and an electrode, while providing low resistance characteristics and a low electrolyte absorption ratio of a binder resin.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
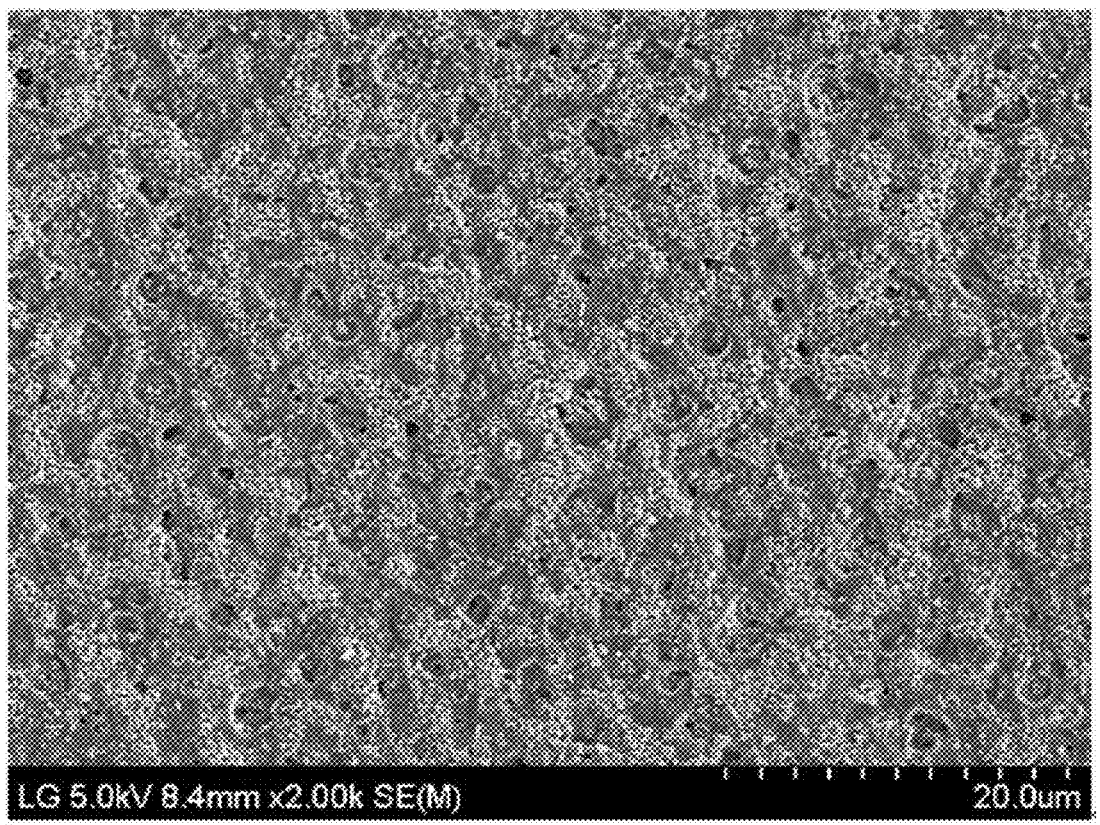
FIG. 1 is a scanning electron microscopic (SEM) image illustrating the surface of the inorganic coating layer of the separator obtained from Example 1.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part [includes] an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to a separator for an electrochemical device and an electrochemical device including the same. As used herein, the term 'electrochemical device' means a device converting chemical energy into electrical energy by electrochemical reactions and has a concept covering a primary battery and a secondary battery, wherein the secondary battery is rechargeable and has a concept covering a lithium ion battery, nickel-cadmium battery, nickel metal hydride battery, or the like.

1. Separator (Structure of Separator) The separator according to the present disclosure includes a porous substrate including a plurality of pores, and an inorganic coating layer formed on at least one surface of the porous substrate.

According to an embodiment of the present disclosure, the separator may have a thickness of 5-20 μm and the thickness may be controlled adequately within the above-defined range. For example, the thickness may be 18 μm or less, or 15 μm or less. In addition, the separator may have a permeability of about 38-60%.

As used herein, the term 'permeability' means a time required for 100 cc of air to pass through an object, such as a separator or porous substrate, to be tested for permeability, is expressed in the unit of second/100 cc, may be used exchangeably with 'transmission', and is generally represented by Gurley value, or the like. According to an embodiment of the present disclosure, the permeability may be determined according to JIS P8117. In addition, air permeability P1 determined for an object having a thickness of T1 may be converted into air permeability P2 of the object having a thickness of 20 μm according to the mathematical formula of $P2=(P1\times20)/T1$.

Meanwhile, according to the present disclosure, the separator has an electrolyte absorption ratio larger than 0% and equal to or less than 30%. When the separator has an excessively high electrolyte absorption ratio, the binder resin contained in the inorganic coating layer may be swelled to cause blocking of pores, resulting in a decrease in ion conductivity of the separator. Thus, it is required to control the upper limit of the electrolyte absorption ratio of the binder resin in the separator to 30%. Within the above-defined range, the electrolyte absorption ratio may be 10% or more, 15% or more, or 20% or more. In addition, the electrolyte absorption ratio may be 27% or less, or 25% or less, within the above-defined range.

According to the present disclosure, the electrolyte absorption ratio means a change in weight before and after dipping a separator in an electrolyte for 72 hours (Formula 1):

Electrolyte absorption ratio (%)=[(Weight of polymer resin after dipping−Weight of initial polymer resin)/(Weight of initial polymer resin)]× 100 [Formula 1]

According to an embodiment of the present disclosure, when determining the electrolyte absorption ratio, the electrolyte includes an organic solvent, and the organic solvent includes an ester based compound in an amount of 30 wt % or more based on 100 wt % of the organic solvent. For example, an electrolyte including ethylene carbonate (EC) and propyl propionate (PP) mixed at a ratio of EC:PP=30:70 (volume ratio) may be used. The electrolyte used when determining the electrolyte absorption ratio may not include a lithium salt or optionally include a lithium salt. According to an embodiment of the present disclosure, the electrolyte may include a lithium salt, such as $LiPF_6$, at a concentration of 1 mol in an organic solvent including EC and PP mixed at a ratio of EC:PP=30:70 (volume ratio).

1) Porous Substrate

The porous substrate means a porous ion-conducting barrier which allows ions to pass therethrough while interrupting an electrical contact between a negative electrode and a positive electrode, and has a plurality of pores formed therein. The pores are interconnected so that gases or liquids may pass from one surface of the substrate to the other surface of the substrate.

Materials forming the porous substrate may be any organic materials or inorganic materials having electrical insulation property. Particularly, with a view to imparting a shut-down function to a substrate, it is preferred to use a thermoplastic resin as a material forming the substrate. Herein, the term 'shut-down function' means a function of preventing thermal runaway of a battery by allowing a thermoplastic resin to be molten so that the pores of the porous substrate may be closed and ion conduction may be interrupted, when the battery temperature is increased. As a thermoplastic resin, a thermoplastic resin having a melting point less than 200° C. is suitable, polyolefin being particularly preferred. In addition to polyolefin, the thermoplastic resin include at least one polymer resin selected from polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene. The porous substrate may include a non-woven web, a porous polymer film, or a laminate of two or more layers thereof, but is not limited thereto.

Particularly, the porous polymer substrate is any one of the following a) to e):

a) A porous film formed by melting/extruding a polymer resin;
b) A multilayer film formed by stacking two or more layers of the porous films of a);
c) A non-woven web formed by integrating filaments obtained by melting/spinning a polymer resin;
d) A multilayer film formed by stacking two or more layers of the non-woven webs of c); and
e) A porous composite film having a multilayer structure including two or more of a) to d).

According to the present disclosure, the porous substrate preferably has a thickness of 3-12 μm, or 5-12 μm. When the thickness is smaller than the above-defined range, it is not possible to obtain a sufficient conducting barrier function. On the other hand, when the thickness is excessively larger than the above-defined range (i.e. the porous substrate is excessively thick), the separator may show excessively increased resistance.

According to an embodiment of the present disclosure, polyolefin preferably has a weight average molecular weight of 100,000-5,000,000. When the weight average molecular weight is smaller than 100,000, it is difficult to ensure sufficient dynamic physical properties. In addition, when the weight average molecular weight is larger than 5,000,000, shut-down characteristics may be degraded or molding may become difficult. In addition, the porous substrate may have a puncture strength of 300 gf or more in terms of improvement of production yield. The puncture strength of a porous substrate refers to the highest puncture load (gf) measured by carrying out a puncture test with Kato tech KES-G5 hand compression tester under the conditions of a needle tip radius of curvature of 0.5 mm and a puncture rate of 2 mm/sec.

According to an embodiment of the present disclosure, the porous polymer substrate may be any porous polymer substrate as long as it is a planar porous polymer substrate used for an electrochemical device. For example, an insulating thin film showing high ion permeability and mechanical strength and generally having a pore diameter of 10-100 nm and a thickness of 5-12 μm may be used.

2) Inorganic Coating Layer

A. Structure of Inorganic Coating Layer

According to the present disclosure, the separator includes an inorganic coating layer formed on one surface of the porous substrate. The inorganic coating layer includes a mixture containing a binder resin and inorganic particles, and the binder resin includes a polyvinylidene fluoride-based (PVdF-based) resin. The inorganic particles are closely packed in the inorganic coating layer and the inorganic coating layer has a plurality of micropores derived from the interstitial volumes formed between inorganic particles. The micropores are interconnected to provide a porous structure which allows gases or liquids to pass from one surface to the other surface. According to an embodiment of the present disclosure, the inorganic particles are totally or partially coated with the binder resin and are bound to one another in a face-to-face or dot-to-dot manner by means of the binder resin. According to an embodiment of the present disclosure, the binder resin and inorganic particles are present at a weight ratio of 15:85-50:50 in the inorganic coating layer. In other words, the binder resin may be present in an amount of 15-50 wt % based on 100 wt % of the combined weight of the binder resin and the inorganic particles. Within the above-defined range, the amount of binder resin may be 20 wt % or more, 30 wt % or more, or 40 wt % or more, and 40 wt % or less, 30 wt % or less, or 20 wt % or less. For example, the binder resin may be present in an amount of 15-25 wt % based on 100 wt % of the combined weight of the binder resin and the inorganic particles.

According to an embodiment of the present disclosure, the inorganic coating layer has an average pore size of 20-1,000 nm. Within the above-defined range, the average pore size of the inorganic coating layer may be 800 nm or less, or 500 nm or less, and independently from or in combination with this, the average pore size may be 20 nm or more, 50 nm or more, or 100 nm or more. For example, the average pore size of the inorganic coating layer is 20-800 nm. The pore size may be calculated from image analysis from scanning electron microscopic (SEM) images. When the pore size is smaller than the above-defined range, the binder resin in the coating layer may be swelled, thereby making it easy to block the pores. When the pore size is beyond the above-defined range, it is difficult for the separator to function as an insulation film and self-discharge characteristics may be degraded undesirably after manufacturing a secondary battery.

According to an embodiment of the present disclosure, the inorganic coating layer preferably has a porosity of 30-80%. A porosity of 30% or more is advisable in terms of lithium ion permeability, and a porosity of 80% or less provides a surface opening ratio which is not excessively high to suitably ensure adhesion between a separator and an electrode.

Meanwhile, according to the present disclosure, the porosity and pore size may be determined by BELSORP (BET apparatus) available from BEL JAPAN Co. using an adsorption gas, such as nitrogen, or through a method, such as mercury intrusion porosimetry or capillary flow porosimetry. According to an embodiment of the present disclosure, the thickness and weight of the resultant coating layer may be measured to calculate porosity from the theoretical density of the coating layer.

The inorganic coating layer preferably has a thickness of 1.5-5.0 μm on one surface of the porous substrate. Preferably, the thickness may be 1.5 μm or more.

Within the above-defined range, it is possible to provide excellent adhesion to an electrode, thereby providing increased cell strength of the battery. Meanwhile, an inorganic coating layer thickness of 5.0 μm or less is advisable in terms of cycle characteristics and resistance characteristics of the battery.

B. Materials for Inorganic Coating Layer

B1. Binder Resin

According to an embodiment of the present disclosure, the binder resin includes a polyvinylidene fluoride (PVdF)-based polymer resin. Preferably, the PVdF-based polymer resin is used in an amount of 80 wt % or more, or 90 wt % or more, based on 100 wt % of the binder resin. The PVdF-based polymer resin has a weight average molecular weight of 600,000 or less, or 400,000 or less. When the weight average molecular weight is 600,000 or less, flexibility is increased to improve adhesion desirably. Herein, the weight average molecular weight of PVdF-based resin may be obtained by gel permeation chromatography (GPC).

According to an embodiment of the present disclosure, the PVdF-based polymer resin may include at least one of vinylidene fluoride homopolymer (i.e. polyvinylidene fluoride), copolymer of vinylidene fluoride with a copolymerizable monomer and a mixture thereof. According to an embodiment of the present disclosure, a fluorinated monomer and/or a chlorinated monomer may be used as monomer. Non-limiting examples of the fluorinated monomer include at least one of vinyl fluoride; trifluoroethylene (TrFE); chlorofluoroethylene (CTFE); 1,2-difluoroethylene; tetrafluoroethylene (TFE); hexafluoropropylene (HFP); perfluoro(alkylvinyl)ether, such as perfluoro(methylvinyl)ether (PMVE), perfluoro(ethylvinyl)ether (PEVE) and perfluoro(propylvinyl)ether (PPVE); perfluoro(1,3-dioxole); and perfluoro(2,2-dimethyl-1,3-dioxole) (PDD), or the like.

The PVdF-based polymer resin satisfies any one of a melting point (Tm) of 145° C. or less, preferably 140° C. or less, a crystallization degree of 30-45%, and a crystallization temperature of 120° C. or less.

According to an embodiment of the present disclosure, the PVdF-based polymer resin may have a melting point (Tm) of 145° C. or less, preferably 140° C. or less, in terms of adhesion upon thermal adhesion. In addition, the PVdF-based polymer resin advisably has a crystallization degree of 30% or more with a view to improvement of resistance characteristics. However, an excessively high crystallization degree causes degradation of adhesion. Therefore, it is preferred to control the crystallization degree to 45% or less. In addition, when the crystallization temperature (Tc) is high, the crystallization degree is increased and there is a tendency of alpha crystallization. Thus, the crystallization temperature is preferably 120° C. or less.

According to the present disclosure, the crystallization temperature may be determined through differential scanning calorimetry (DSC) and is based on the temperature (peak temperature) at the point where the highest enthalpy appears. In addition, the crystallization degree is obtained by dividing the melting enthalpy value (ΔH) measured from DSC by the melting enthalpy value (ΔH) of theoretically perfect crystals (crystallization degree 100%) and is expressed in the unit of %. Herein, the melting enthalpy value of theoretically perfect crystals may refer to the polymer handbook for known polymers. In the case of unknown materials or newly synthesized materials, the melting enthalpy value of theoretically perfect crystals may be calculated by the extrapolation method in which crystallization degrees at two or more points are extended.

According to an embodiment of the present disclosure, the PVdF polymer resin has a melting point of 145° C. or lower, a crystallization degree of 30-45% and a crystallization temperature of 120° C. or lower. When the above-defined range is satisfied, the PVdF-based polymer resin shows a weakly crystalized form (mainly including beta crystals), while providing a sufficient crystallization degree, so that resistance characteristics may not be degraded. Thus, the inorganic coating layer has improved flexibility, thereby ensuring low resistance characteristics in addition to adhesion between an electrode and a separator.

According to an embodiment of the present disclosure, the PVdF-based polymer resin preferably includes a copolymer of vinylidene fluoride units with another copolymerizable monomer, wherein the copolymer is present preferably in an amount of 80 wt % or more, 90 wt % or more, or 99 wt % or more, based on 100 wt % of the PVdF-based polymer resin. According to an embodiment of the present disclosure, the copolymer includes vinylidene fluoride in an amount of 70 mol % or more as a copolymerization unit, wherein the substitution ratio with the monomer is 5-30 mol %. According to an embodiment of the present disclosure, the substitution ratio may be 8 mol % or more, 10 mol % or more, 15 mol % or more, or 18 mol % or more, and 25 mol % or less, 20 mol % or less, 17 mol % or less, or 15 mol % or less. For example, the substitution ratio may be 10-25 mol %.

Such a PVdF-based polymer resin having a relatively low molecular weight as mentioned above may be obtained by emulsion polymerization or suspension polymerization, preferably suspension polymerization.

According to an embodiment of the present disclosure, the PVdF-based polymer resin includes a copolymer of vinylidene fluoride units with another copolymerizable monomer in an amount of 80 wt % or more, 90 wt % or more, or 99 wt % or more, wherein the monomer includes trifluoroethylene (TrFE), tetrafluoroethylene (TFE) or both and the substitution ratio with the monomers is 5-30 mol %. According to an embodiment, the substitution ratio may be 8 mol % or more, 10 mol % or more, 15 mol % or more, or 18 mol % or more, and 25 mol % or less, 20 mol % or less, 17 mol % or less, or 15 mol % or less. For example, the substitution ratio may be 10-25 mol %. In other words, according to an embodiment of the present disclosure, the PVdF-based polymer resin may include PVdF-TrFE, PVdF-TFE or both, and the substitution ratio with TrFE and/or TFE may be the same as described above.

Particularly, in the case of trifluoroethylene (TrFE) and tetrafluoroethylene (TFE), they show lower steric hindrance as compared to chlorofluoroethylene (CTFE) and hexafluoropropylene (HFP). Thus, even when PVdF is substituted with TrFE and/or TFE, PVdF chains may be concentrated effectively and any free volume between polymer chains is not allowed. As a result, it is possible to reduce the electrolyte absorption ratio and to control it within the above-defined range. In other words, since vacant spaces are hardly generated between polymer chains to reduce the electrolyte absorption ratio so that the polymer resin may not be swelled excessively, it is possible to prevent the pores of the porous coating layer from being blocked by swelling of the polymer resin. Therefore, the porosity in the separator can be maintained at an adequate level. As a result, since the porosity of the separator can be maintained at an adequate level despite formation of the porous coating layer on the surface of the separator, it is possible to improve low resistance characteristics of the separator.

According to the present disclosure, the PVdF-based binder resin substituted with the monomers can be controlled to a melting point (Tm) of 145° C. or less, and thus is favorable to improvement of adhesion. In addition, such PVdF-based binder resins have a low crystallization temperature and include a beta crystal structure, and thus advisably realize a desired level of adhesion and show a crystallization degree favorable to realization of low resistance characteristics. In addition, when using a PVdF-based binder resin substituted with trifluoroethylene (TrFE) and/or tetrafluoroethylene (TFE), it is possible to control the electrolyte absorption ratio to 30% or less, and thus to maintain the porosity in the separator suitably.

According to an embodiment of the present disclosure, the inorganic coating layer may further include a (meth)acrylic polymer resin as a binder resin. The (meth)acrylic polymer includes (meth)acrylate as a monomer and particular examples thereof include (meth)acrylic polymers including butyl (meth)acrylate, 2-ethylhexyl (meth)acrylate, ethyl (meth)acrylate, methyl (meth)acrylate, n-propyl (meth)acrylate, isopropyl (meth)acrylate, t-butyl (meth)acrylate, pentyl (meth)acrylate, n-octyl (meth)acrylate, isooctyl (meth)acrylate, isononyl (meth)acrylate, lauryl (meth)acrylate or tetradecyl (meth)acrylate, as a monomer. The (meth)acrylic polymer may be present in an amount of 20 wt % or less based on 100 wt % of the total binder resin.

According to an embodiment of the present disclosure, the inorganic coating layer may further include additives, such as a dispersing agent and/or thickening agent, in an amount of 1-3 wt % based on 100 wt % of the inorganic coating layer. According to an embodiment of the present disclosure, the additive may be at least one selected suitably from polyvinyl pyrrolidone (PVP), polyvinyl alcohol (PVA), hydroxyethyl cellulose (HEC), hydroxypropyl cellulose (HPC), ethylhydroxyethyl cellulose (EHEC), methyl cellulose (MC), carboxymethyl cellulose (CMC), hydroxyalkyl methyl cellulose, and cyanoethylene polyvinyl alcohol.

B2. Inorganic Particles

According to the present disclosure, there is no particular limitation in the inorganic particles, as long as they are electrochemically stable. In other words, there is no particular limitation in the inorganic particles that may be used herein, as long as they cause no oxidation and/or reduction in the range (e.g. 0-5V based on $Li/Li^+$) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be high-dielectric constant inorganic particles having a dielectric constant of 5 or more, preferably 10 or more. Non-limiting examples of the inorganic particles having a dielectric constant of 5 or more may include $BaTiO_3$, $Pb(Zr,Ti)O_3$ (PZT), $Pb_{1-x}La_xZr_{1-y}Ti_yO_3$ (PLZT, wherein 0< x <1, 0<y<1), $Pb(Mg_{1/3}Nb_{2/3})O_3PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, or a mixture thereof.

In addition, as inorganic particles, it is possible to use inorganic particles having lithium ion transportability, i.e. inorganic particles which contain lithium elements and do not store lithium but transport lithium ions. Non-limiting examples of the inorganic particles having lithium ion transportability include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$-based glass (1<x<4, 0<y<13), such as $14Li_2O-9Al_2O_3-38TiO_2-39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), such as $Li_{3.25}Ge_{0.25}P_{0.75}S_4$, lithium nitride ($Li_xN_y$, 0<x<4, 0<y<2), such as $Li_3N$, $SiS_2$-based glass ($Li_xSi_yS_z$, 0<x<3, 0<y<2, 0<z<4), such as $Li_3PO_4-Li_2S-SiS_2$, and $P_2S_5$-based glass ($Li_xP_yS_z$, 0<x<3, 0<y<3, 0<z<7), such as $LiI-Li_2S-P_2S_5$, or a mixture of two or more of them.

In addition, there is no particular limitation in the average particle diameter of the inorganic particles. However, the inorganic particles preferably have an average particle diameter of 0.1-1.5 μm with a view to formation of a coating layer with a uniform thickness and suitable porosity. When the average particle diameter is smaller than 0.1 μm, dispersibility may be degraded. When the average particle diameter is larger than 1.5 μm, the resultant coating layer may have an increased thickness.

2. Method for Manufacturing Separator

The separator according to the present disclosure may be obtained by applying slurry for forming an inorganic coating layer containing the binder resin and inorganic particles onto a porous substrate and solidifying the binder resin to form an inorganic coating layer integrally on the porous substrate. Particularly, the binder resin is dissolved in a solvent first to prepare a polymer solution. Next, the inorganic particles are introduced to and mixed with the polymer solution to prepare slurry for forming an inorganic coating layer. Then, the slurry is applied onto the porous substrate and is allowed to stand under the condition of a relative humidity of about 40-80% for a predetermined time to solidify (dry) the binder resin. At that time, phase separation of the binder resin is induced. During the phase separation, the solvent moves toward the surface portion of the inorganic coating layer and the binder resin is moved toward the surface portion of the inorganic coating layer according to the movement of the solvent so that the content of binder resin may be increased at the surface portion of the inorganic coating layer. While pores are formed at the portion below the surface portion of the inorganic coating layer due to the interstitial volumes between inorganic particles, the inorganic coating layer has porous property. When a PVdF-based copolymer including TrFE and/or TFE at a predetermine ratio is used as a binder resin according to an embodiment of the present disclosure, such binder resins show a lower phase separation rate as compared to a PVdF-based copolymer including HFP or CTFE as a polymerization unit. Therefore, excessive phase separation is prevented. For example, such excessive phase separation occurs when the binder resin is moved excessively toward the surface portion of the inorganic coating layer during the drying step, and the portion in which the inorganic particles are concentrated is separated from the binder resin to form a separate binder resin layer having a predetermined thickness on the topmost portion of the inorganic coating layer. According to an embodiment of the present disclosure, the inorganic coating layer may have a binder resin content increasing toward the surface portion thereof. However, in the inorganic coating layer, the inorganic particles are mixed with the binder resin as a whole in the thickness direction of the inorganic coating layer, and the porous structure derived from the interstitial volumes between inorganic particles is retained from the bottom of the inorganic coating layer to the top thereof. As a result, the inorganic coating layer can maintain a low level of resistance. In addition, the method for forming an inorganic coating layer as described above facilitates control of a process by virtue of such a low phase separation rate of the binder resin.

The present inventors have found that PVdF copolymers show slower phase separation behavior during humidified drying at a higher ratio of substituents, as compared to PVdF homopolymer. Thus, the present disclosure is based on the fact that the binder distribution in the thickness direction of the inorganic coating layer can be controlled by using the above-mentioned characteristic. In the case of the copolymer, it is possible to control the phase separation rate during drying with more ease by using a polymerization unit, such as trifluoroethylene (TrFE) or tetrafluoroethlene (TFE), which can maintain density better after substitution, as compared to hexafluoroethylene, and controlling the substitution ratio of the monomers within a specific range. In other words, since phase separation is slow, it is possible to prevent the binder resin used for the inorganic coating layer from being moved toward the surface of the inorganic coating layer during drying and being distributed intensively on the surface to cause an increase in interfacial resistance. It is also possible to allow the binder resin to maintain uniform distribution in the inorganic coating layer. Thus, it is possible to reinforce adhesion between the porous substrate and the inorganic coating layer even with a small amount of binder.

Then, the resultant separator is dried to form an inorganic coating layer integrally on the porous substrate.

The slurry may include a solvent which is an ingredient capable of dissolving the PVdF-based resin. For example, the solvent may be selected suitably from acetone, methyl ethyl ketone, N-methyl pyrrolidone, and polar amide solvents such as dimethyl acetamide and dimethyl formamide.

The slurry may be applied through a conventional coating process, such as Mayer bar coating, die coating, reverse roll coating or gravure coating. When the inorganic coating layer is formed on both surfaces of the porous substrate, the coating solution may applied to each surface and then humidified phase separation and drying may be carried out. However, it is preferred to apply the coating solution to both surfaces of the porous substrate at the same time, followed by humidified phase separation and drying, in terms of productivity.

In addition, the separator according to the present disclosure may be obtained by manufacturing an inorganic coating layer and a porous substrate separately, stacking them, and forming a composite by using hot pressing or an adhesive. For example, to obtain the inorganic coating layer as an independent sheet, the slurry may be applied to a release sheet to form an inorganic coating layer in the same manner as described above, and only the inorganic coating layer may be released.

3. Electrode Assembly Including Separator

Meanwhile, the present disclosure provides a secondary battery including the separator. The battery includes a negative electrode, a positive electrode and a separator interposed between the negative electrode and the positive electrode, wherein the separator is a low-resistance separator having the above-described characteristics. According to the present disclosure, the positive electrode includes a positive electrode current collector and a positive electrode active material layer formed on at least one surface of the current collector and containing a positive electrode active material, a conductive material and a binder resin. The positive electrode active material may include any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode includes a negative electrode current collector, and a negative electrode active material layer formed on at least one surface of the current collector and containing a negative electrode active material, a conductive material and a binder resin. The negative electrode may include, as a negative electrode active material, any one selected from: lithium metal oxide; carbon such as non-graphitizable carbon or graphite-based carbon; metal composite oxides, such as $Li_xFe_2O_3 (0 \leq x \leq 1)$, $Li_xWO_2 (0 \leq x \leq 1)$, $Sn_xMe_{1-x}Me'_yO_z$ (Me: Mn, Fe, Pb, Ge; Me': Al, B, P, Si, elements of Group 1, 2 or 3 in the Periodic Table, halogen; $0 < x \leq 1$; $1 \leq y \leq 3$; $1 \leq z \leq 8$); lithium metal; lithium alloy; silicon-based alloy; tin-based alloy; metal oxides, such as AuO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, Super-P, acetylene black, Ketjen black, channel black, furnace black, lamp black, thermal black, denka black, aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may include stainless steel, copper, aluminum, nickel, titanium, baked carbon, aluminum or stainless steel surface-treated with carbon, nickel, titanium or silver, or the like.

The binder resin may be a polymer used currently for an electrode in the art. Non-limiting examples of the binder resin include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl 1polyvinylalchol, cyanoethyl cellulose, cyanoethyl sucrose, pullulan, and carboxymethyl cellulose.

The electrode assembly prepared as described above may be introduced to a suitable casing and an electrolyte may be injected thereto to obtain a battery.

According to the present disclosure, the electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), ester based compounds and mixtures thereof. However, the present disclosure is not limited thereto.

Meanwhile, according to an embodiment of the present disclosure, the organic solvent includes an ester based compound. Preferably, the ester based compound may be used in an amount of 30 wt % or more, 50 wt % or more, 60 wt % or more, or 65 wt % or more, based on 100 wt % of the organic solvent.

According to an embodiment of the present disclosure, the ester based compound includes at least one selected from the group consisting of isobutyl propionate, isoamyl propionate, isobutyl butyrate, isopropyl propionate, methyl propionate, ethyl propionate, propyl propionate, butyl propionate, methyl acetate, ethyl acetate, propyl acetate, butyl acetate, methyl butyrate, ethyl butyrate, propyl butyrate and butyl butyrate.

When using such an ester based compound, it is possible to realize high ion conductivity, which is significantly advisable in terms of application to secondary batteries for high-output vehicles. However, in the case of such an ester based compound, electrolyte absorption ratio of a PVdF-based copolymer, such as PVdF-HFP, is high so that the porosity of the inorganic coating layer may be degraded. However, as described above, the separator according to the present disclosure includes PVdF-TrFE and/or PVdF-TFE as a binder resin for the inorganic coating layer, and PVdF-TrFE and PVdF-TFE can maintain an ester based compound absorption ratio at 30% or less. Therefore, when using PVdF-TrFE and/or PVdF-TFE as a binder resin for the inorganic coating layer and an ester based compound as an electrolyte, it is possible to maximize ion conductivity characteristics, which is significantly favorable to manufacture of a battery for high-output devices, such as electric vehicles.

In addition, the present disclosure provides a battery module which includes a battery including the electrode assembly as a unit cell, a battery pack including the battery module, and a device including the battery pack as an electric power source. Particular examples of the device include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, 18 g of PVdF-TFE (VT-475 available from Daikin, Tm 138° C., electrolyte absorption ratio 24%, TFE 14 mol %) and 2 g of cyanoethylene polyvinyl alcohol as a dispersing agent were dissolved in 400 g of acetone to prepare a polymer solution. Herein, PVdF-TFE has a crystallization temperature of 117° C. and a crystallization degree of 37.7%. Next, 80 g of $Al_2O_3$ (LS235 available from Japan Light Metal) was introduced thereto and dispersed by using a ball mill to prepare slurry for an inorganic coating layer. The slurry was coated onto a porous substrate (B12PA1 available from Toray) through a dip coating process and vapor-induced phase separation was induced at a relative humidity (RH) of 60%. The inorganic coating layer was formed on both surfaces of the substrate with a total thickness of 8 μm. FIG. 1 is an electron microscopic image illustrating the inorganic coating layer surface of the separator obtained from Example 1. The separator according to Example 1 undergoes phase separation induced to an adequate level as shown in FIG. 1. It can be seen that the binder resin is distributed in the inorganic coating layer and is not moved excessively toward the surface portion of the inorganic coating layer. In addition, according to the electron microscopic image analysis, it is shown that the inorganic coating layer has an average pore size of 20-800 nm.

The separator obtained from Example 1 had an electric resistance of about 0.9 ohm. In addition, the separator showed a good peel force of 65 gf/25 mm.

Example 2

A separator was manufactured in the same manner as Example 1, except that PVdF-TrFE (Solvene 200 available from Sigma-Aldrich, Tm 131° C., electrolyte absorption ratio 27%, TrFE 20 mol %) was used. Herein, PVdF-TrFE has a crystallization temperature of 119° C. and a crystallization degree of 32.4%. The separator obtained from Example 2 had an electric resistance of 0.92 ohm and a peel force of 60 gf/25 mm.

Example 3

A separator was manufactured in the same manner as Example 1, except that 9 g of PVdF-TFE (VT-475 available from Daikin) used in Example 1 was mixed with 9 g of PVdF-TrFE (Solvene 200 available from Sigma-Aldrich) used in Example 2. The separator obtained from Example 3 had an electric resistance of 0.91 ohm and a peel force of 63 gf/25 mm.

Comparative Example 1

Figure 2:
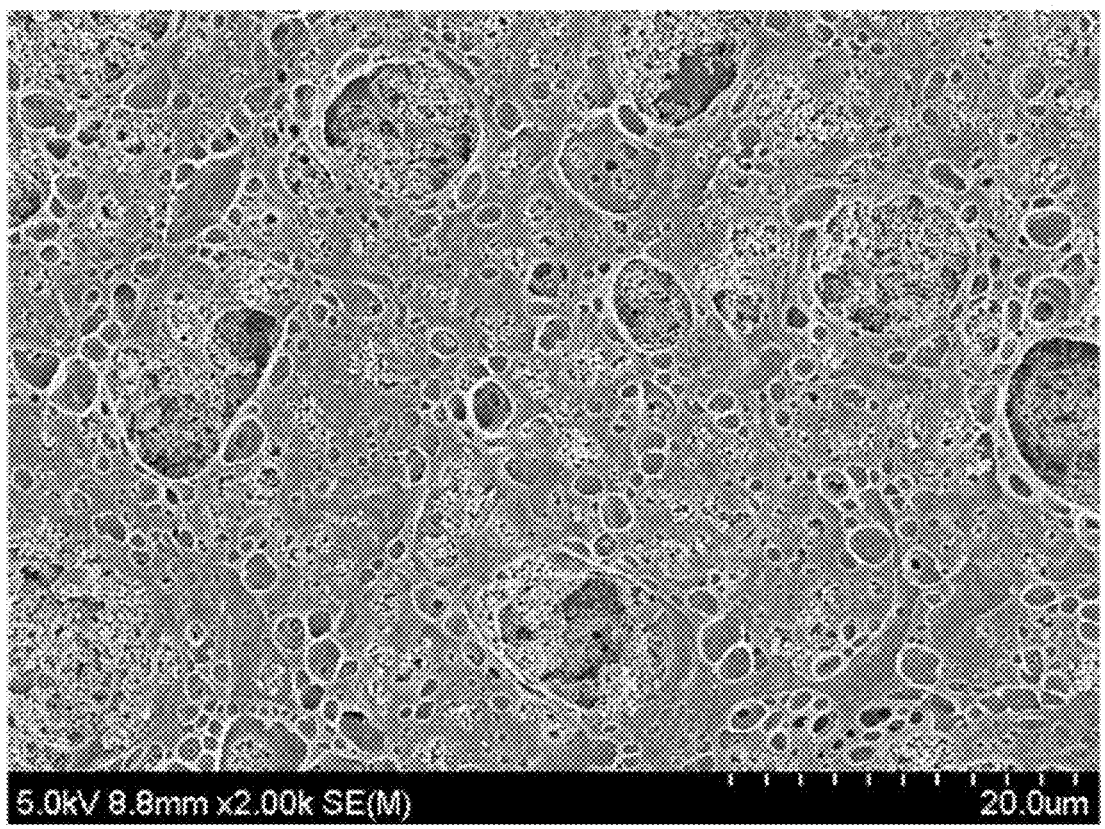
FIG. 2 is a SEM image illustrating the surface of the inorganic coating layer of the separator obtained from Comparative Example 1.

A separator was manufactured in the same manner as Example 1, except that PVdF-HFP (Solvay Solef 21510, Tm 132° C., electrolyte absorption ratio 110%, HFP 13 mol %) was used as a binder. Herein, PVdF-HFP has a crystallization temperature of 134° C. and a crystallization degree of 25.4%. FIG. 2 is an electron microscopic image illustrating the inorganic coating layer surface of the separator obtained from Comparative Example 1. It can be seen that a layer having a high concentration of binder resin is formed on the surface of the separator according to Comparative Example 1, since the binder resin ingredient is moved excessively toward the surface portion of the inorganic coating layer.

The separator obtained from Comparative Example 1 had an electric resistance of about 1.1 ohm and a peel force of 71 gf/25 mm.

Comparative Example 2

A separator was manufactured in the same manner as Example 1, except that PVdF-HFP (Arkema, Kynar 2500, Tm 125° C., electrolyte absorption ratio 145%, HFP 16 mol %) was used. Herein, PVdF-TFP has a crystallization temperature of 132° C. and a crystallization degree of 23.7%. The separator obtained from Comparative Example 2 had an electric resistance of about 1.2 ohm. The separator had a good peel force of 76 gf/25 mm.

Comparative Example 3

A separator was manufactured in the same manner as Example 1, except that PVdF-HFP (Kureha 8200, Tm 155° C., electrolyte absorption ratio 29%, HFP 2 mol %) was used. Herein, PVdF-HFP has a crystallization temperature of 139° C. and a crystallization degree of 28.1%. The separator obtained from Comparative Example 3 had an electric resistance of about 0.94 ohm and a peel force of 45 gf/25 mm.

Electrolyte Absorption Ratio

The electrolyte absorption ratio was determined by dipping each separator in an electrolyte for 72 hours and calculating a change in weight according to the following Formula 1.

Electrolyte absorption ratio (%)=[(Weight of polymer resin after dipping−Weight of initial polymer resin)/(Weight of initial polymer resin)]×100  [Formula 1]

The electrolyte used for determination of the electrolyte absorption ratio was a mixed organic solvent containing ethylene carbonate (EC) and propyl propionate (PP) at a volume ratio of 30:70.

Method for Determination of Resistance

The resistance of each of Examples and Comparative Examples was determined by the following method. An electrolyte was prepared by dissolving 1M LiPF$_6$ in a mixed solvent containing ethylene carbonate, propylene carbonate and propyl propionate at a volume ratio of 25:10:65. Each separator was impregnated with the electrolyte and the electric resistance was determined by using a multi-probe analyzer (available from Hioki).

Method for Evaluating Peel Force (Adhesion Strength)

The separator sample obtained from each of Examples and Comparative Examples (e.g. Example 1) was cut into a size of 100 mm (length)×25 mm (width) to prepare two test specimens. The two test specimens was stacked and subjected to hot pressing at 100° C. for 10 seconds to obtain a laminate. The laminate was fixed to an adhesion strength tester (LLOYD Instrument, LF plus) and the upper separator specimen was peeled off at 25° C. and a rate of 25 mm/min with an angle of 180°, and the adhesion strength was measured.

TABLE 1

| Separator | Electric resistance (ohm) | Peel force (gf/25 mm) |
| --- | --- | --- |
| Example 1 | 0.90 | 65 |
| Example 2 | 0.92 | 60 |
| Example 3 | 0.91 | 63 |
| Comp. Ex. 1 | 1.1 | 71 |
| Comp. Ex. 2 | 1.2 | 76 |
| Comp. Ex. 3 | 0.94 | 45 |

The test results of electric resistance and peel force for each of the separators according to Examples and Comparative Examples are shown in Table 1. Referring to Table 1, the separators according to the embodiments of the present disclosure show low electric resistance while providing an adequate level of peel force. On the contrary, the separators according to Comparative Examples 1 and 2 exhibit good peel force but show high electric resistance, and the separator according to Comparative Example 3 exhibits a value of electric resistance similar to the electric resistance of the separators according to the embodiments of the present disclosure, but shows degradation of peel force.

What is claimed is:

1. A separator for an electrochemical device, comprising:
a porous substrate and an inorganic coating layer formed on at least one surface of the porous substrate,
wherein the inorganic coating layer comprises a binder resin and inorganic particles,
the binder resin is a polyvinylidene fluoride-based resin containing at least one polymerization unit selected from the group consisting of trifluoroethylene and tetrafluoroethylene, and the polyvinylidene fluoride-based resin has a substitution ratio of 15-30 mol % with the polymerization unit, wherein the polyvinylidene fluoride-based resin has a melting point (Tm) of 145° C. or lower, wherein the polyvinylidene fluoride-based resin has a crystallization temperature of 120° C. or lower, and wherein the polyvinylidene fluoride-based resin has a crystallization degree of 30-40%.

2. The separator according to claim 1, wherein the polyvinylidene fluoride-based resin has an electrolyte absorption ratio of 30% or less as determined by following Formula 1:

Electrolyte absorption ratio (%)=[(Weight of polymer resin after dipping−Weight of initial polymer resin)/(Weight of initial polymer resin)]× 100  [Formula 1].

3. The separator according to claim 2, wherein an electrolyte for determining the electrolyte absorption ratio comprises an organic solvent and a lithium salt, and the organic solvent comprises an ester based compound in an amount of 30 wt % or more based on 100 wt % of the organic solvent.

4. The separator of claim 2, wherein the electrolyte absorption ratio is from 10% to 30%.

5. The separator according to claim 1, wherein the binder resin and inorganic particles are present at a weight ratio of 15:85-50:50 in the inorganic coating layer.

6. The separator according to claim 1, wherein the inorganic coating layer has an average pore size of 20-800 nm.

7. An electrochemical device comprising an electrode assembly and an electrolyte, wherein the electrode assembly comprises a positive electrode, a negative electrode and a separator interposed between the positive electrode and the negative electrode, and the separator is defined in claim 1.

8. The electrochemical device according to claim 7, wherein the electrolyte comprises an organic solvent and a lithium salt, and the organic solvent comprises an ester based compound in an amount of 30 wt % or more based on 100 wt % of the organic solvent.

9. A method for forming the separator of claim 1, comprising:

applying a slurry for forming an inorganic coating layer comprising a binder resin and inorganic particles onto a porous substrate; and solidifying the binder resin to form the inorganic coating layer integrally on the porous substrate.

10. The method of claim 9, wherein the applying slurry comprises:

dissolving the binder resin in a solvent to form a polymer solution; and mixing the inorganic particles with the polymer solution to form the slurry.

11. The method of claim 9, wherein the solidifying the binder resin comprises:

allowing the porous substrate with the slurry to stand under a condition of a relative humidity of about 40-80% to induce phase separation of the binder resin.

12. The method of claim 11, wherein a content of binder resin is increased at the surface portion of the inorganic coating layer during phase separation.

* * * * *